3,170,958
MONO- AND DI-SECONDARY ALIPHATIC ETHERS

William L. Howard, Lake Jackson, Tex., assignor to The Dow Chemical Company, Midland, Mich., a corporation of Delaware
No Drawing. Filed May 8, 1961, Ser. No. 108,240
1 Claim. (Cl. 260—611)

The present invention relates to a novel and useful method for preparing mono- and di-secondary aliphatic ethers having the general formula

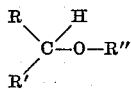

wherein R and R' represent radicals independently selected from the group consisting of lower alkyl radicals containing from 1 to 6 carbon atoms and cycloalkyl radicals containing 5 to 6 carbon atoms and wherein R and R' can be joined together to form with the carbon of attachment a cyclic ring containing from 5 to 6 carbon atoms. R" represents a member selected from the group consisting of lower primary and secondary alkyl radicals, cycloalkyl radicals having from 5 to 6 carbon atoms and the phenyl radical.

In accordance with the present invention a ketal having the general formula

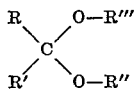

wherein R, R', and R" have the afore-assigned values and wherein R''' represents a member independently selected from the group consisting of lower primary and secondary alkyl radicals, cycloalkyl radicals having from 5 to 6 carbon atoms and the phenyl radical, is reacted by contacting with hydrogen under acidic conditions in the presence of a rhodium catalyst at a temperature of from about 0° to about 250° C. under subatmospheric, atmospheric or superatmospheric pressure. The ether can be recovered in conventional manner after removal of the catalyst. A convenient manner of recovery, after filtration, is to react the by-product alcohol with an acid or anhydride to form a non-volatile ester and then distill off the ether.

The ketals which can be employed in accordance with the present invention are those having the aforesaid general formula, as for example: acetone dimethyl ketal; acetone diethyl ketal; acetone dipropyl ketal; acetone isopropyl propyl ketal; acetone isopropyl butyl ketal; acetone isopropyl cyclohexyl ketal; butanone dimethyl ketal; pentanone butyl methyl ketal; cyclohexanone cyclohexyl methyl ketal; and the like, to name only a few of those which fall within the generic formula above.

The ketals can be prepared in accordance with the procedures described in my copending applications Serial Nos. 796,288, now U.S. Patent No. 3,127,450, 796,289, now U.S. Patent No. 3,072,727, 796,290, now abandoned, and 799,399, now abandoned, respectively, filed March 2, 1959.

The acidic conditions required for carrying out the instant invention can be achieved by adding from 0.001 to 10 percent by weight based on the ketal of substantially any acid such as the inorganic acids, i.e., Lewis acids, HCl, $H_2SO_4$, $H_2SO_3$, or any substance which will give the desired acidic condition and maintain it. The preferred amount of acid is in the range of from 0.01 to about 1 percent by weight.

The temperature of reaction can be from about 0° to 250° C. and preferably is from about 20° to 100° C.

The pressure can range from subatmospheric, i.e., about 0.1 atmosphere, to superatmospheric, i.e., about 1000 atmospheres, and is primarily dependent on economy and equipment costs. The pressure can conveniently be produced by the hydrogen alone although when carrying out the reaction above about 100 atmospheres it may be more economical to employ a diluent gas such as nitrogen to obtain the higher pressures.

The rhodium catalyst can conveniently be supported on alumina or other well known catalyst supports.

It is to be understood that vigorous agitation is usually necessary to insure rapid and complete reaction.

It is also to be understood that inert solvents may be employed to dissolve the solid ketals or merely to assist in carrying out the reaction. The solvent should be inert under the conditions of reaction.

The following examples illustrate the present invention but are not to be construed as limiting:

*Example I.—Hydrolygenolysis of acetone dibutyl ketal*

Acetone dibutyl ketal, 380 parts, 2 parts of a rhodium metal catalyst (5% rhodium on alumina) and concentrated hydrochloric acid, 0.1 part, were combined and shaken in a hydrogen atmosphere, starting at 50 p.s.i.g. After 4 hours the pressure had dropped to 44.5 p.s.i.g., and the mixture was heated to 60° C. and shaking was continued for another 23 hours. After cooling the reactor to room temperature the pressure was 37 p.s.i.g. (theoretical for complete reaction, 34 p.s.i.g.). The vessel was opened, the solution was filtered free of catalyst, and the filtrate was heated to 65° for 2 hours with 230 parts of maleic anhydride. After the reaction of the by-product butanol with the anhydride, the butyl isopropyl ether was distilled through a Vigreux column under reduced pressure, giving 120 parts of the ether boiling at 48–50°/130 mm. An additional 70 parts was obtained by adding xylene to the distilling flask as a distillation chaser; total yield 82%.

*Example II.—Hydrogenolysis of acetone dimethyl ketal*

In a manner similar to that employed in Example I, acetone dimethyl ketal was treated with hydrogen. It was necessary to add fresh catalyst from time to time and the reaction was continued for four days. From 208 parts of the ketal, 2 parts of the rhodium catalyst, and 0.5 part of concentrated hydrochloric acid, there were obtained 35 parts of isopropyl methyl ether (about 25% yield), 28 parts of methanol, and 148 parts of the ketal. The ether was isolated by fractional distillation of the hydrogenolysis mixture, and was 98% pure by gas chromatographic analysis.

*Example III.—Hydrogenolysis of acetone diisopropyl ketal*

Acetone diisopropyl ketal, 320 parts, rhodium catalyst 2 parts, and concentrated hydrochloric acid, 0.05 part, were hydrogenated as above, but without heating. After one hour the pressure drop was 15.5 p.s.i. (theoretical 16 p.s.i.). The catalyst was filtered off and the filtrate was washed with 200 ml. of water in five portions. The organic layer was separated and dried with potassium carbonate, giving 150 parts (74%) of diisopropyl ether, B.P. 69°, $n_D^{23}$ 1.3669, $d_{24}$ 0.724. Distillation of the aqueous phase gave a practically quantitative yield of isopropyl alcohol.

*Example IV.—Hydrogenolysis of cyclohexanone diisopropyl ketal*

In a manner similar to that of Example III, 200 parts of cyclohexanone diisopropyl ketal were hydrogenated for 3½ hours to give 130 parts (93%) of cyclohexyl isopropyl ether, B.P. 155–6°, $n_D^{25}$ 1.4283, $d_{25}$ 0.846 g./ml., 98% pure by gas chromatographic analysis. The ether was isolated by washing the filtered hydrogenolysis mixture with water and drying the organic layer with potassium carbonate. The aqueous phase was distilled, giving 70 parts of water-isopropyl alcohol azeotrope, B.P. 70–85°, $n_D^{25}$ 1.3757 (theoretical isopropyl alcohol, 60 parts).

*Example V.—Hydrogenolysis of acetone dicyclohexyl ketal*

In a manner similar to that of Example IV, 280 parts of acetone dicyclohexyl ketal, hydrogenated for 3 hours, gave 100 parts (60%) of cyclohexyl isopropyl ether. It was separated from the by-product cyclohexanol by refluxing the filtered hydrogenolysis mixture with phthalic anhydride and distilling. The cyclohexyl acid phthalate was isolated by alkaline extraction but was not purified or further examined. Analysis of the hydrogenolysis mixture by infrared spectrophotometry indicated that the production of ether and alcohol was quantitative.

I claim:

A method comprising reacting by contacting a compound having the formula

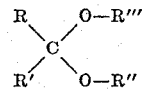

wherein R and R' represent radicals independently selected from the group consisting of lower alkyl and cycloalkyl radicals containing from 1 to 6 carbon atoms and wherein R and R' can be joined together to form a cyclic ring having from 5 to 6 carbon atoms, and wherein R'' and R''' represent radicals independently selected from the group consisting of lower primary and secondary alkyl radicals, cycloalkyl radicals having from 5 to 6 carbon atoms and phenyl radical; with hydrogen under acidic conditions in the presence of rhodium metal catalyst at from about 0° to about 250° C.

References Cited in the file of this patent

UNITED STATES PATENTS

| | | |
|---|---|---|
| 2,122,812 | Groll et al. | July 5, 1938 |
| 2,189,529 | Carothers et al. | Feb. 6, 1940 |
| 2,590,598 | Copenhaver | Mar. 25, 1952 |